Aug. 18, 1942.   O. STEINER   2,293,477
PHOTOGRAPHIC FLASH SYNCHRONIZATION EQUIPMENT
Original Filed July 19, 1940   4 Sheets-Sheet 1
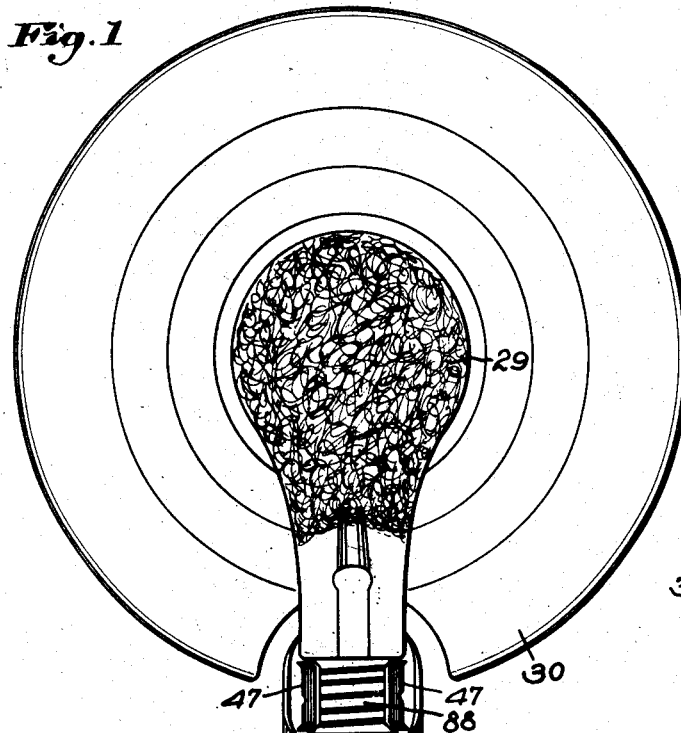
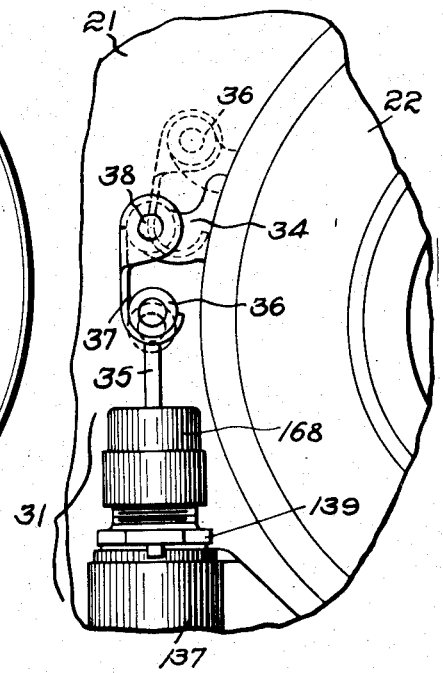
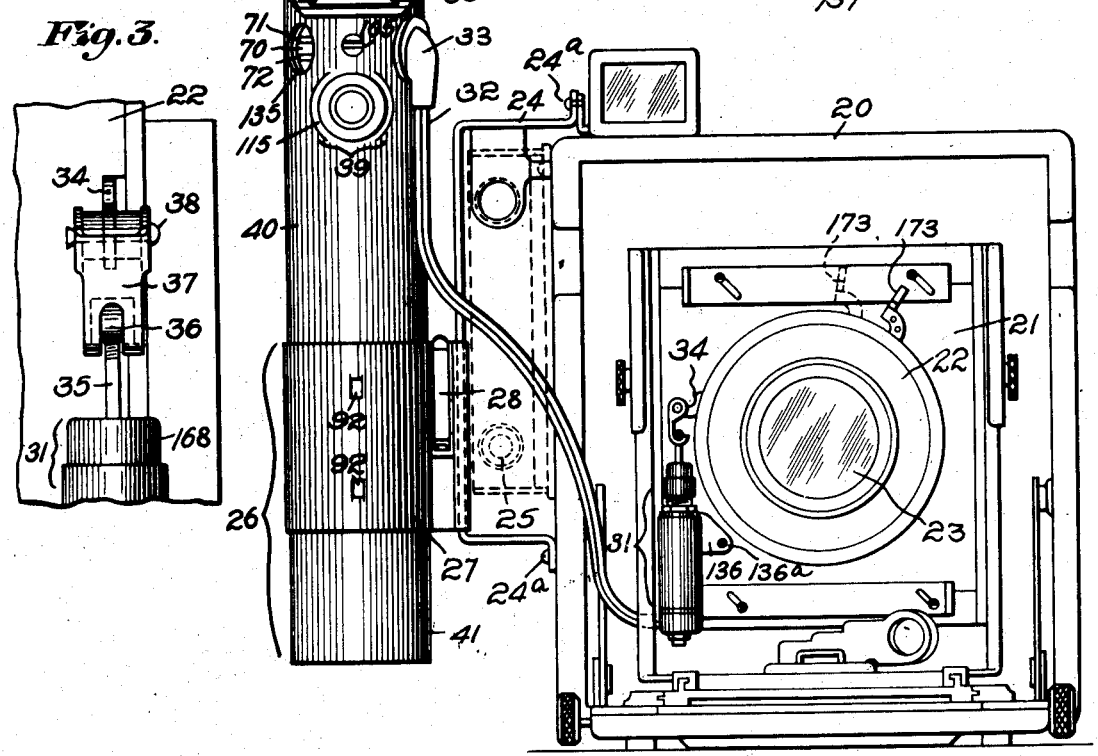
Inventor:
Oscar Steiner,
by Emery, Booth, Townsend, Miller and Whidden,
Attys.

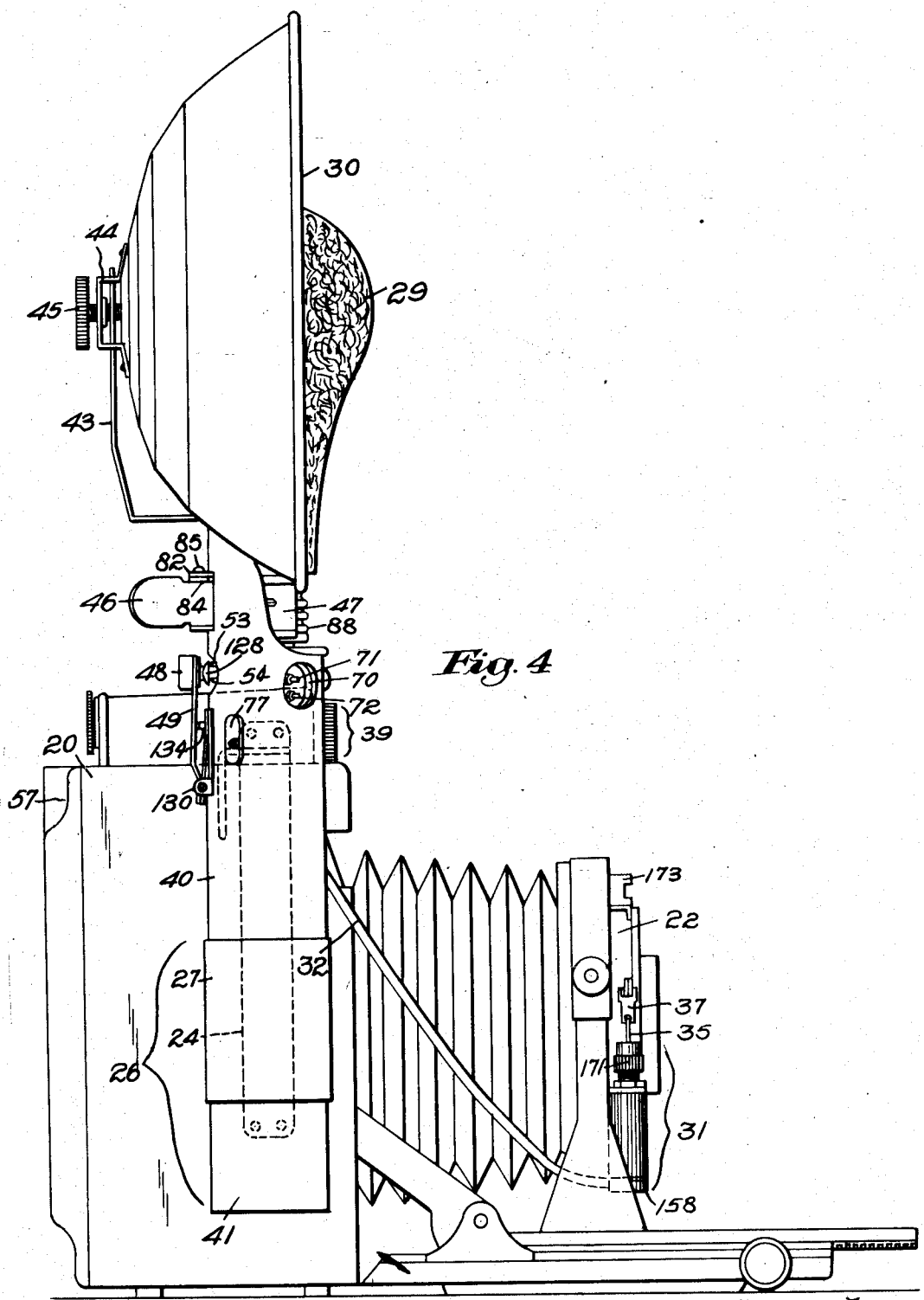

Aug. 18, 1942.  O. STEINER  2,293,477
PHOTOGRAPHIC FLASH SYNCHRONIZATION EQUIPMENT
Original Filed July 19, 1940  4 Sheets-Sheet 3
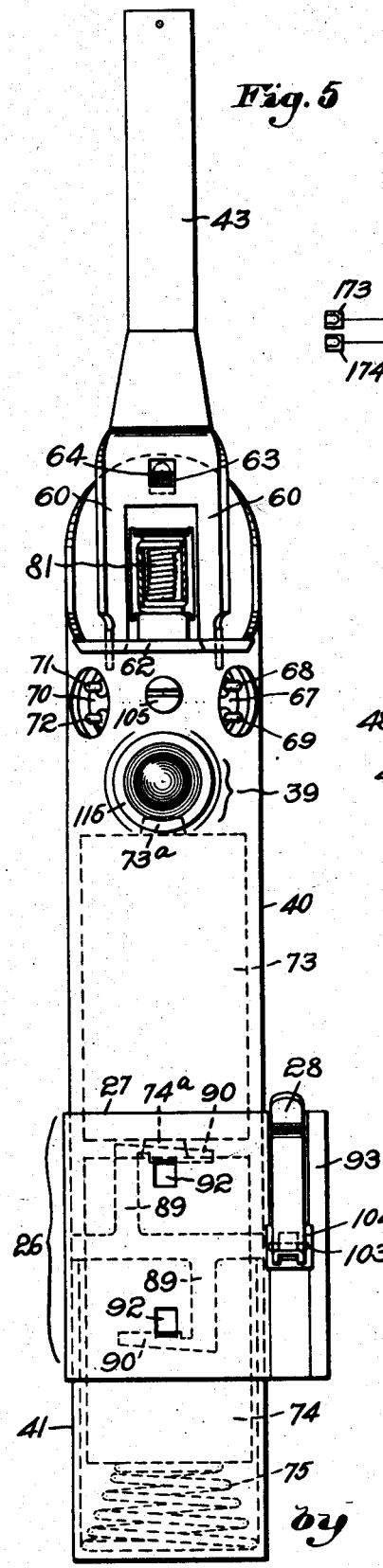
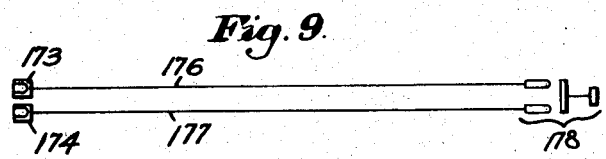
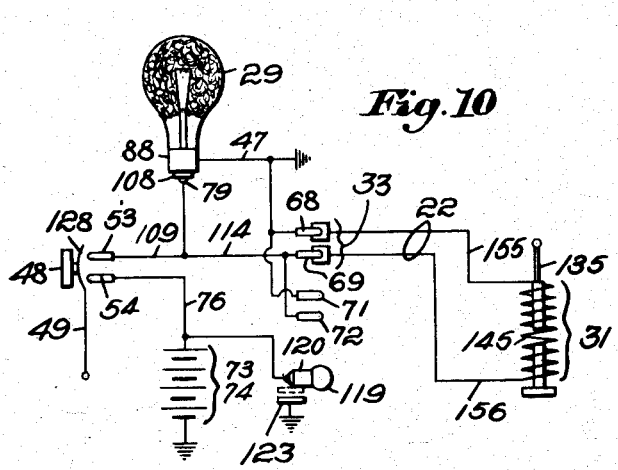
Inventor:
Oscar Steiner,
by Attys.

Aug. 18, 1942. O. STEINER 2,293,477
PHOTOGRAPHIC FLASH SYNCHRONIZATION EQUIPMENT
Original Filed July 19, 1940 4 Sheets-Sheet 4

Inventor:
Oscar Steiner,
by Emery, Booth, Townsend, Miller & Neisberg
Attys.

Patented Aug. 18, 1942

2,293,477

UNITED STATES PATENT OFFICE 2,293,477

PHOTOGRAPHIC FLASH SYNCHRONIZATION EQUIPMENT

Oscar Steiner, Irondequoit, N. Y., assignor to The Folmer Graflex Corporation, Rochester, N. Y., a corporation of Delaware Original application July 19, 1940, Serial No. 346,395. Divided and this application April 15, 1941, Serial No. 388,614

16 Claims. (Cl. 67—29)

This application is a division of my co-pending application Ser. No. 346,395, filed July 19, 1940.

This invention relates to photographic flash synchronization equipment.

In order that the principle of the invention may be readily understood, I have disclosed a single embodiment, with several indicated uses thereof, in the accompanying drawings, wherein—

Fig. 1 is a front plan view of a camera having attached thereto a synchronizing equipment in accordance with my invention, the battery case being attached to the left hand side of the camera box and the magnetic tripper to the lens board of the camera;

Fig. 2 is an enlarged fragmentary detail in elevation of Fig. 1, showing the connecting clevis between the shutter operating lever and the magnetic-tripper connecting-arm;

Fig. 3 is a detail in side elevation of Fig. 2;

Fig. 4 is a side view of the camera and equipment showing the battery case on the camera box and the magnetic tripper on the lens board, the camera being open and a bulb in place ready for operation;

Fig. 5 is a front view in elevation of the battery case removed from the camera, showing the position of the reflector support bracket, the reflector being removed and the batteries being shown in dotted lines;

Fig. 9 is a diagram of the wiring as required for remote control; and

Fig. 10 is a circuit diagram of the synchronizer equipment, showing the connection for the operation of the front shutter.

Figure 6:
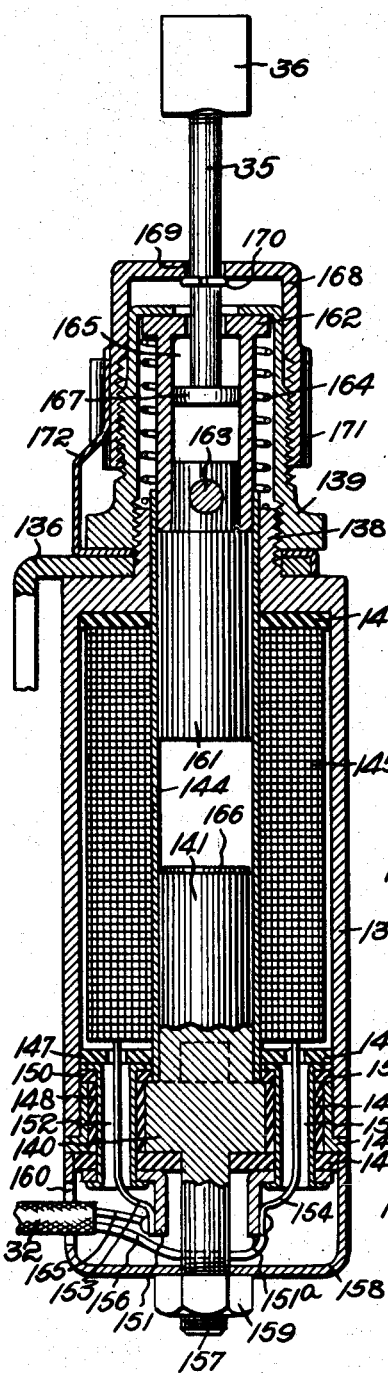
Fig. 6 is a vertical cross section through the magnetic tripper which is in non-operative position, the coil not having been energized.

I am aware that there have been numerous devices produced for the purpose of synchronizing the flashing of a photo-flash lamp with the opening of a photographic shutter, but so far as I am aware they have all been very limited in their scope of operation, have been hard to adjust and the accuracy of such adjustment has been difficult to maintain.

I have by my invention provided a synchronizing equipment that is readily adaptable to all types of camera shutters, both the front or between-the-lens type and the focal-plane shutter type, and such equipment of my invention readily lends itself to precision manufacturing. The parts of the equipment as constructed in accordance with my invention are of great strength and they coordinate effectively in their several adjustments, whatever be the type of camera upon which they are used.

My present invention particularly relates to a magnetic tripping device allowing the maximum adjustment of time delay between the time of flashing the lamp and the operation of the shutter, means being provided for quickly disconnecting the magnetic tripper from the shutter operating or release lever when other than instantaneous exposures are to be made.

The foregoing and other features of my invention are fully set forth in the following description.

Making reference first to Figs. 1 to 3 and 4, the casing of the camera is indicated generally at 20. While the invention may be applied to any desired type of camera, I have chosen to illustrate the same as applied to the well known Graphic type of camera. The synchronizing equipment of my invention can, however, be applied to any type of camera having the usual between-the-lens shutter or the usual focal plane shutter or having both such shutters.

The camera is preferably provided with a detachable lens board 21 carrying a between-the-lens shutter 22 having a lens 23. Attached to the camera casing 20 is a battery-case bracket 24, and the ends whereof are attached to the camera casing by screws 24a, 24a, the shape of the said bracket 24, as herein shown, being such that it extends sufficiently about the range finder 25 usually provided on such type of camera. A bracket of different construction may, of course, be used when the camera does not carry a range finder.

The battery case is indicated generally at 26 and is made up of two parts clamped or otherwise removably secured together and supported by a clamp member or ring 27, which is itself secured to the battery bracket 24 by a clamping lever 28.

The battery case 26 is so constructed as to carry a flash lamp or bulb 29. A reflector 30 is also provided for the purpose of concentrating the light of the said flash bulb upon the object to be photographed.

Figure 7:
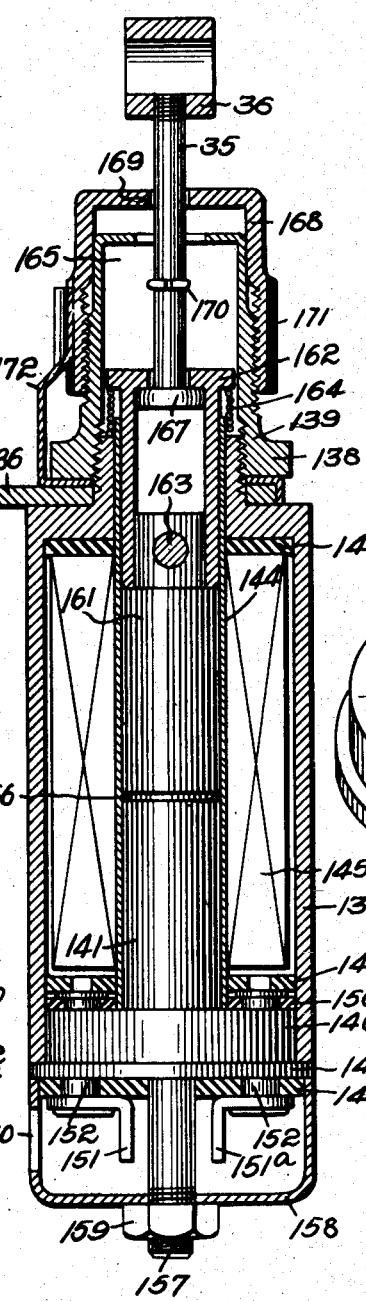
Fig. 7 is a view similar to Fig. 6, the coil having been energized and the armature having moved downward, carrying with it the shutter operating connecting link.

I have indicated generally at 31 in Figs. 1 and 4 and in detail in Figs. 6 and 7, a magnetic tripper at 31. This is preferably attached to the lens board 21 by means of two or more screws 136a, one screw only being shown. Said magnetic tripper 31 is electrically connected to battery case 26 by means of a cable 32 and a plug 33 shown in Fig. 1. An operating or release lever 34, which may be of usual construction and which is provided upon the shutter 22, is operated by a shaft or rod 35 provided with a connecting bar 36 for engaging a clevis 37 attached to the shutter operating or release lever 34 by means of a pin 38. The structure of the magnetic tripper will be described in detail at a subsequent point.

Returning to the structure of the battery case 26, shown in Figs. 1 and 5 particularly, the case itself is made up of two preferably cylindrical sections 40, 41, the section 40 being the upper and the section 41 being the lower one. For ordinary use, I have provided two dry cells of some well known type of manufacture.

The camera having the synchronized equipment attached thereto has, as shown in side elevation in Fig. 5, the reflector 30 supported by a reflector bracket 43 attached to the upper battery-case section 40, which serves to support said reflector in such position that it can be readily adjusted along (that is, lengthwise of) the said bracket 43. The reflector 30 is provided with a clamping bracket 44 and a clamp screw 45. When the latter is loosened the reflector 30 can be adjusted up and down along the bracket 43, and thus can be set in proper position with respect to the flash lamp 29 which is held to the battery case 26 by means of a clamping socket having operating arms 46, 46 and jaws 47, 47, fully disclosed at a subsequent point in the specification. An operating button 48 is provided for completing the circuit through the flash-lamp 29 and the magnetic tripper 31 when the front or between-the-lens shutter is provided. When, however, the synchronizer equipment is to be used in cooperation with the rear or focal-plane shutter, I provide in conjunction therewith a structure which may be such as is disclosed in my Patent No. 2,188,065, dated January 23, 1940, and which therefore need not be more fully described here.

In such use there is provided an operating button 48 indicated in Fig. 4, which is carried by a flat spring member or arm 49 hinged to a suitable bracket attached to the upper battery-case section 40, the parts being so constructed that the spring member or arm 49 can be turned downward so that the connecting plug can be positioned for operating the focal plane shutter.

The battery case 26 (but with the reflector removed) is shown in Fig. 5, which indicates how the reflector bracket 43 is attached to the battery case. The said bracket 43 is provided with a hooked formation or member 63 which engages a hole 64 in the upper battery-case section 40. In order to remove the bracket 43, it is merely necessary to apply downward pressure on the bracket 43.

As indicated in Fig. 5, the connecting plug 33 has been removed from a socket 67 in the battery case, thereby exposing contact members 68 and 69. A second socket 70 is provided on the left hand side of the battery case as the same is viewed in Fig. 5. Within said socket are contact members 71 and 72. In Fig. 5, the batteries 73, 74 are indicated in dotted lines. They have positive contact members 73a, 74a respectively, and the lower battery-case section 41 is provided with a spring 75 for maintaining a contact to or with the negative side of the battery cell, said spring also serving to apply upward pressure on the battery cells 73, 74, causing contact to take place between the positive connection 73a (shown in dotted lines in Fig. 5) and the positive contact member 76. An auxiliary lamp control button is indicated at 77. An auxiliary lamp is indicated generally at 39 in Figs. 1 and 4.

The auxiliary lamp 39 is not only used in locating the object to be photographed, but it is used for adjusting the position or angle of the reflector 30, so that the reflector will throw the light in the proper direction for making the desired photograph.

In order to complete the circuit through the photo-flash lamp 29, and the batteries to the operating button 48, which is insulated from the arm 49, there is attached a contact disk 128. As indicated in the circuit diagram Fig. 10, when button 48 is pressed, contact is made between contact member 53 and connecting member 54, thus completing a circuit through the lamp contact 79, connector member 53, contact disk 128, connector member 54, and positive contact strip 76 to the battery contact of the battery 73, and then through said battery to the contact of battery 74, then through said battery to battery-case sections 41 and 40, through battery socket members 47, flash-lamp base 88 and lamp contact 108, thus completing a circuit through the photo-flash lamp 29 and the batteries.

The said switch arm 49 is so constructed that it can be swung downward away from the connector members 53 and 54, so that the focal-plane shutter connector can be attached to the said connectors 53 and 54, thus putting the focal-plane shutter contacts in series with the photo-flash lamp 29, and if contact is made between said contacts, a circuit will be completed, thus causing the flash lamp 29 to be ignited. When the magnetic tripper 31 is in use, the switch arm 49 overlies the contacts 53 and 54, thus preventing anyone from connecting any auxiliary device to those contacts, which, if done, would cause the flash-lamp 29 to be flashed inadvertently. To permit the use of additional flash-lamps remote from the battery case, there are provided two additional sets of connectors 68, 69, 71, 72, which are in parallel with the photo-flash lamp base by means previously described.

If, however, a magnetic tripper is connected to either set of connectors 68, 69 or 71, 72, the magnetic tripper will also be in parallel with the photo-flash lamp 29. I have provided a magnetic tripper to be used with the equipment, thereby making it possible to make photo-flash exposures by any one of the three well known methods, the first of which is the so-called "open and shut" method, wherein the camera shutter is set at "bulb" exposure, and the shutter is caused to be opened at the same time that contact button 48 is pressed, whereupon the shutter is immediately allowed to close. In this method, however, the exposure time is limited by the duration of the photo-flash lamp. The second method of photo-flash synchronization is carried out by the use of the focal-plane shutter, as disclosed in my Patent No. 2,188,065 above referred to, and in use the button 48 and switch arm 49 are swung downward out of the way, the focal-plane shutter being connected through connectors 53 and 54. The third method of photo-flash synchronization is carried out through the use of an electro-magnetic tripper for operating the front shutter.

Figure 8:
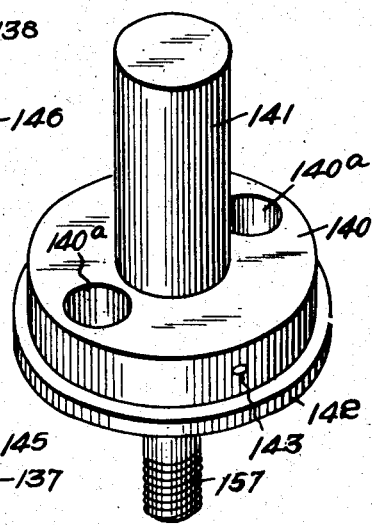
Fig. 8 is an enlarged, perspective detail of the base of the magnetic tripper.

My improved means for operating the front or between-the-lens shutter will now be described, and in doing so reference will be made particularly to Figs. 6, 7, 8, and briefly to Fig. 1.

The electro-magnetic tripper is shown in vertical cross section in Figs. 6 and 7. This structure has been developed through a long period of experimentation and research and it operates more effectively than any magnetic tripper with which I am familiar.

As shown in Fig. 1, the said tripper is mounted on the lens board 21, being carried by a bracket 136 secured to said lens board by screws 136a. While this is its preferable location, I am not limited thereto. A portion of the said bracket 136 is shown in Fig. 6 also. Upon such bracket is mounted a cylindrical casing 137 having a threaded neck 138 passing through a hole in said bracket and held thereto by a cylindrical cap 139. To the lower end of said cylinder is attached a metal base 140 having an upwardly extending cylindrical member 141 constituting a stationary armature, and a stop or projection 142 so as properly to position the base in said cylinder 137. Said base 140 is held in the cylinder 137 by means of a locking screw (not shown) engaging a threaded hole 143. Over the cylindrical member or armature 141 is fitted a non-magnetic tube 144 preferably of brass and around said tube is wound a coil 145 of insulated magnetic wire. On the upper end of the coil 145 is placed an insulating washer 146, and on the lower end an insulating washer 147. The said base 140 is provided with two holes 140a, 140a, shown in Fig. 8, through which pass two insulating bushings 148, 148. On the lower side of the base 140 is another insulating washer 149 and on the top face of said base are placed two small insulating washers 150, 150, and passing therethrough and through the tube 148, washer 149, and wire lug 151, is a metal eyelet 152 spun over on each end, thus holding the assembly to the base 140. Passing through a hole in the insulating bushing 147 in the metal eyelet 152 are two leads 153, 154 of the coil 145. The lead 153 is attached to lug 151 and the lead 154 is attached to lug 151a. The connecting cable 32 is made up of wires 155, 156. This constitutes the preferred means for connecting the coil 145 with the cable 32. The base 140 has a downwardly extending member 157 threaded on the lower end, and fitted over the said member 157 is a wire shield or guard 158 held in place by a nut 159. A hole 160 is provided in the shield 158 for the passage of the cable 32. Fitted into the upper portion of the tube 144 is a movable magnetic armature or solenoid plunger 161 having attached thereto a sleeve 162 by means of a rivet 163. About said sleeve 162 is a coiled spring 164 tending to thrust the said sleeve and the armature or solenoid plunger 161 upward until the limit of motion is reached at the cylindrical cap 139. Riding in a space 165 of the sleeve 162 is a disk 167 attached to the shutter tripping shaft or rod 35 in any well known manner, said shaft or rod 35 and the disk 167 being entirely free to move within the space 165 provided in the sleeve 162.

When an electrical circuit is completed through the coil 145, the movable armature or solenoid plunger 161 will be drawn downward toward the stationary armature 141 until it contacts with a non-magnetic plate 166 placed on the stationary armature 141 to prevent sticking of the movable armature or solenoid plunger 161 to the said stationary armature. The shaft or rod 35 will not commence to move immediately, nor until the partially closed end of the sleeve 162 contacts with the disk 167, at which time the shaft or rod 35 will travel with the armature or solenoid plunger 161 until it reaches its limit of action.

In order to adjust the length of space between the disk 167 and the partly closed end of the sleeve 162, so that the initial stroke of the movable armature or solenoid plunger 161 can be varied, there is provided an adjusting sleeve 168 having a circular hole 169 for the passage of said shaft or rod 35. In a groove in said shaft or rod 35 is placed a cylindrical ring 170 engaged by the top wall of the adjusting sleeve 168, when the said shaft or rod 35 is moved in an upward direction under the influence of the shutter actuating arm 34, shown in Figs. 1, and 2. It will be apparent that, because of the presence of the ring 170, by turning the adjusting sleeve 168 in a clockwise direction, said shaft or rod 35 will be moved downward, and the length of the space 165 between the closed end of sleeve 162 and the disk 167 will become greater, because the threads provided on the sleeve 139 and 168 are cut in a right hand direction, thus allowing the armature or solenoid plunger 161 to travel a greater distance before the rod or shaft 35 begins to move downward. If, however, the adjusting sleeve 168 is turned in a contraclockwise direction, the length of the space between the partially closed end of sleeve 162 and the disk 167 will become less, thus allowing the armature or solenoid plunger 161 to travel a shorter distance before the shaft or rod 35 commences to move. In order to hold the adjusting sleeve 168 in any predetermined position, there is provided a series of serrations or notches 171 on the outer wall of the adjusting sleeve 168, which are engaged by a spring 172 held to the magnetic tripper assembly by the cylindrical nut 139.

In Fig. 9 is shown a circuit diagram for use in remote control, by which I mean the operation of the flash synchronizer from a distance. This is done by connecting suitable plugs 173, 174 to connectors 53, 54 (Fig. 10), and by attaching a wire 176 to the connector plug 173 and attaching a wire 177 to the connector plug 174, said wires 176, 177 being connected to a suitable switch 178. When the switch 178 is operated, a circuit is completed through the connectors 53, 54 in precisely the same manner as if the button 48 had been pressed.

The circuit diagram of the flash synchronizer equipment when the magnetic tripper is used on a front or between-the-lens shutter is shown in Fig. 10, from which it appears that the batteries 73 and 74 are connected in series and then to ground, the ground in this instance being the battery case 26 made up, as stated, of the upper section 40 and a lower section. To the positive terminal 73a, Fig. 5, of the battery 73 is connected the strip 76 which is connected to the contact or connector 54. The auxiliary lamp bulb 119 has contact with one side of the positive connector 76, and the base 120 of said lamp bulb 119 has contact with the contact strip 123, as shown in dotted lines in Fig. 10. Connected to the plug 53 is the center contact 79 which makes contact with the lower lamp contact 108. The current then passes through the filament of the flash lamp 29, through the base to the ground (namely, the battery case 26). The connectors 68 and 71 are also connected to ground and the connector plug 69 is connected to plug 53, connector plug 72 being connected to the plugs 69 and 53. When the magnetic tripper is used, the plug 68 is connected to wire 155 and the current passes through coil 145 to wire 156 and then to connector plug 69. The coil 145, flash lamp 29, and plugs 71, 72 are in parallel, and the plugs 53, 54 are in series with flash lamp 29 and the battery, made up of the cells 73 and 74 in the present instance.

I will now trace through such of the various combinations of circuits in the operation of the photo-flash equipment herein set forth as particularly concern the invention herein claimed.

It will first be assumed that it is desired to make a so-called "open and shut" photo-flash, meaning, as already stated, that the camera shutter is set on the "bulb" position and is in that position when the operating or shutter release lever 34 is pressed, the shutter being open and remaining open until the said lever 34 is released.

In making this type of exposure the battery case is placed on the camera as shown in Figs. 1 and 4. The plug 33 and the cable 32 are not in place, and there is no magnetic tripper attached to the shutter, it having been removed from the lens board, it being removably mounted therein by means of the bracket 136. A flash lamp 29 is placed in the socket jaws 47, 47 and the auxiliary lamp contact is pushed upwardly, thereby causing a beam of light to be projected in the direction of the object to be photographed. The clamp 28 is thrown downward and the battery case 26 is turned sufficiently in the member or ring 27 until the light from the auxiliary lamp 39 falls upon the object it is desired to photograph. The clamping lever 28 is then moved into the position shown in Fig. 1.

Assuming that the reflector 30 has been suitably adjusted in a vertical direction with respect to the flash lamp 29 so that the latter will center in the reflector, the most economical use of the light from said flash lamp is made in taking the photograph. After the suitable adjustment has been made, the contact button 79 is moved downwardly, thus extinguishing the auxiliary lamp bulb and the operator then aligns his camera in any well known manner such as through the optical view finder. The shutter release or operating lever 34 is then depressed and at the same time the contact button 48 is pressed inwardly and then immediately both buttons are released. The pressure on the shutter release or operating lever 34 will have opened the shutter, and the pressure on the contact knob 48 will have caused the flash lamp 29 to become illuminated and the release of pressure on said release or operating lever 34 will have allowed the shutter to close. No further pressure will be required on the contact knob 48 since when the flash lamp 29 is ignited its circuit is opened.

When making a flash exposure with the use of the focal-plane shutter, the contact lever 49 is folded downwardly, and the connector plug 52 is connected to contacts 53 and 54. The said plug 52 is attached to a cable having on its opposite end a plug engaged with the focal plane synchronizing socket connected with suitable contacts of the camera back. The flash lamp 29 is inserted in the socket members 47, 47 and the bulb of the auxiliary lamp 39 is illuminated by manipulation of the switch 77 and the reflector 30 is properly aligned from the object to be photographed. The front shutter is set on "time" in the open condition and the back shutter is ready to make an exposure upon releasing the focal-plane-shutter release lever (not here shown). The structure of such focal-plane shutter and the synchronizing mechanism therefor are fully disclosed in my said Patent No. 2,188,065. When the shutter is released, the curtain travels downwardly and at a predetermined point, the said contacts are bridged or connected together by a metallic tab or element on the shutter curtain.

Referring to Fig. 10, inasmuch as the connector 53 is connected with one of the contacts of the focal plane shutter, and the connector 54 is connected with the other contact of said shutter, a circuit will have been closed between them, thus allowing current to flow from the batteries 73, 74, through the positive contact strip 76, connector 54, the cable and contacts for said focal plane shutter, connector 53, to the lamp contact button 79, lamp contact 108, through the filament of the flash lamp 29, to the socket members 47, to ground, which is the battery case, and from ground or battery case to the opposite side of the battery, thus completing the circuit through the photo-flash lamp 29 and causing it to become ignited.

When it is desired to make a photo-flash exposure using the front or between-the-lens shutter, a flash lamp 29 is inserted in the socket jaws 47, 47, and the connector plug 33 is connected to socket 67, thus connecting the magnetic tripper 31 to the electrical circuit of battery case 26. The said battery case is positioned in the manner previously described, so as to ensure the most efficient use of the light from the flash lamp 29. The focal-plane shutter is set in the "open" position. The between-the-lens shutter is set for whatever speed it is desired to use. The shutter is then cocked by moving the lever 173 from the position shown in dotted lines in Fig. 1 to the position shown in solid lines therein, the release or operating lever 34 having been previously connected to the magnetic tripper 31 by means of the clevis 37, a bar 36 and shaft 35, as previously described.

The release or operating lever 34 will now be in the position shown in Fig. 2, depressed part way but not sufficiently far to trip the shutter. The contact bar 49 and the button 48 will be in the position shown in Fig. 4, and pressure on the button 48 will close the contacts 53 and 54. Current will then flow from batteries 73, 74 through positive contact strip 76, connector 54, contact disk 128, connector 53, connector button 79, contact 108 through the filament of flash lamp 29, to base 88 and socket jaws 47, 47 and thence to ground, completing the circuit through the flash lamp 29. The connector 68 is also connected to ground and connector 69 is connected to spring 114, which contacts with the sleeve of the connector button 79. Inasmuch as the connector button 79 has its circuit as previously described, current will also flow through the magnetic tripper winding 145 and through cable 32, which is made up of wires 155, 156. The shaft or rod 35 of magnetic tripper 31 will be caused to move downwardly in the manner previously described through its connection with the movable armature or solenoid plunger 161. The release or operating lever 34 will then be moved downward as indicated by the dotted line position of the connecting bar 36 in Fig. 2, thus releasing the shutter, flashing the lamp 29 and causing an exposure to be made.

It will be understood from the foregoing description that I have provided a photo-flash synchronizing equipment having a great many advantages and improvements over existing synchronizer equipments known to me. Attention is particularly directed to the construction of the magnetic tripper 31, which is such that the movable armature or solenoid plunger 161 is in a free state at the instant of making an exposure; that is, the said armature or solenoid plunger has only to overcome the action of spring 164, which has just sufficient strength to hold the said armature or solenoid plunger in the all-the-way-up position. The said armature or solenoid plunger starts downward when a circuit is completed through the coil 145, and it gains considerable momentum before the shaft or rod 35 has started to move under the influence of disk 167, then the inertia of armature or solenoid plunger 161 is added to the magnetic pull, thus causing the shutter to be operated with a coil winding of relatively high resistance. Since the photo-flash lamp 29 and the magnetic tripper 31 are in parallel at the instant of exposure and since the voltage of flash-light batteries used in synchronizer equipments drops very rapidly as a load of low resistance is connected across them, it is highly important to have a magnetic tripper that will work with very low drain on the battery, so that there will be very little voltage-drop across the filament of the flash lamp.

It will be apparent that the lower the voltage drop at the instant of making an exposure, the more accurate will be the timing of both the magnetic tripper and the flashing of the filament of the flash lamp. Only by the construction of a magnetic tripper as herein disclosed has it been possible to provide a tripper making economical use of the battery current. This has been proven through long testing of the herein disclosed equipment, by a number of operators.

In a test of this equipment, a hundred photoflash pictures were made, the same batteries being used throughout the entire test, and the timing of the flash and the magnetic tripper operating the shutter was still as accurate at the end of such test as at the commencement thereof. Inasmuch as those pictures were all made in rapid sequence, this was a much more severe test than would ordinarily take place, since usually pictures are taken with longer intervals between consecutive pictures, thus allowing the batteries to recuperate.

Having thus described one embodiment, with several indicated uses, of the invention, it is to be understood that although specific terms are employed, they are used in a generic and descriptive sense and not for purposes of limitation, the scope of the invention being set forth in the following claims.

I claim:

1. In mechanism for synchronizing the firing of a flash lamp with the actuation of the operating means of a camera shutter; an electro-magnetic shutter tripper having a coil and a solenoid plunger which latter is movable, by energization of said coil, in a direction to actuate said shutter operating means but which solenoid plunger has always an unvarying starting position, there being a free-sliding lost-motion connection between said plunger and said shutter operating means; a circuit having an operating switch and including said coil and the flash lamp; and readily accessible, manually-manipulable means to vary the distance of movement of said solenoid plunger under the magnetic pull of said coil from said unvarying starting position before the operating means for the shutter is actuated by said plunger movement.

2. A construction according to claim 1 in which the said means for varying such distance of movement of the plunger includes a movable member connected to the operating means of the shutter and also includes another member carried by the said tripper and adjustable thereon, said two members having interengageable formations to cause upon engagement the movement of the shutter operating means, and thus constituting means to provide for the said lost motion between said plunger and said member that is connected to the operating means of the shutter, said adjustable member by its adjustment varying the extent of said lost motion.

3. A construction according to claim 1 but in which, to vary such distance of movement of the solenoid plunger, the said shutter tripper is provided with a member adjustable lengthwise the movement of the solenoid plunger and a member is connected to the operating means of the shutter, said two members having formations compelling movement of the second member by the first upon engagement of such formations, and thus constituting means to provide for the said lost motion between said plunger and said member that is connected to the operating means of the shutter, said adjustable member by its adjustment varying the extent of said lost motion.

4. A construction according to claim 1 but in which, to vary such distance of movement of the solenoid plunger, the shutter tripper is provided with a sleeve 168 and the operating means for the camera shutter extends into said sleeve, said sleeve and said operating means having interengageable operating formations, and thus constituting means to provide for the said lost motion between said plunger and the operating means for the camera shutter, the extent of said lost motion being determined by said sleeve 168.

5. A construction according to claim 1 but in which, to vary such distance of movement of the solenoid plunger, the shutter tripper is provided with an adjustable sleeve 168 and the operating means for the camera shutter extends into said adjustable sleeve, said sleeve and said operating means having interengageable operating formations, the said solenoid plunger having a sleeve into which the said operating means for the shutter extends and providing for lost motion therebetween, said latter sleeve and said operating means having interengageable formations to cause movement upon such engagement of said operating means.

6. A construction according to claim 1 but in which the solenoid plunger is provided with a sleeve 162 and a rod 35 is connected to the operating means of the shutter, and is received within said sleeve and provides for such lost motion between said plunger and said rod 35, said sleeve and rod having interengageable formations which upon energization of the said coil causes operating movement of said rod 35.

7. In mechanism for synchronizing the firing of a flash lamp with the actuation of the operating means of a camera shutter, an electro-magnetic shutter tripper having a coil and a solenoid plunger, which latter is movable by energization of said coil in a direction to actuate said shutter operating means; a circuit having an operating switch and including said coil and the flash lamp; said plunger having an extending sleeve-like member, and a rod connected to the operating means of the camera shutter and extending into said sleeve and providing for free-sliding lost-motion connection between said plunger and said rod, said rod and sleeve having interengageable formations to compel movement of said rod upon such engagement.

8. A construction according to claim 7 in which the said sleeve has an inwardly directed wall and the said rod has a laterally extending projection 167 to be engaged by said wall, to compel said movement of said rod, and in which a sleeve 168 is mounted upon said tripper for lengthwise adjustment thereon to vary the extent of said lost motion, and is provided with a formation to engage the said rod and impart preliminary lengthwise movement thereto without movement of the solenoid plunger.

9. In mechanism for synchronizing the firing of a flash lamp with the actuation of the operating means of a camera shutter, an electro-magnet shutter tripper having a coil and a solenoid plunger, which latter is movable by energization of said coil in a direction to actuate said shutter operating means; a circuit having an operating switch and including said coil and the flash lamp; a sleeve connected to and extending lengthwise beyond said plunger toward the shutter operating means and having a partly closed end formation, a rod 35 connected to the operating means of the camera shutter extending into said sleeve and having a lateral formation to be engaged by said partly closed end formation, and providing for free-sliding lost-motion connection therebetween, and whereby upon engagement of such formations the operating means of the camera shutter is actuated; and readily-accessible manually-manipulable means for varying the distance between said formations prior to the energization of said coil, whereby the lost motion distance that the solenoid plunger travels before moving said rod 35, is varied.

10. In mechanism for synchronizing the firing of a flash lamp with the actuation of the operating means of a camera shutter; an electro-magnetic shutter tripper having a coil and a solenoid plunger, which latter is movable by energization of said coil in a direction to actuate said shutter operating means but which solenoid plunger has always an unvarying starting position; a circuit having an operating switch and including said coil and the flash lamp; said tripper having a stationary armature 141 within said coil, to which stationary armature the solenoid plunger moves upon each energization of said coil; and readily-accessible manually-manipulable means for varying the distance that the solenoid plunger travels toward said stationary armature, upon energization of said coil, before said solenoid plunger moves the operating means of the camera shutter.

11. In mechanism for synchronizing the firing of a flash lamp with the actuation of the operating means of a camera shutter; an electro-magnetic shutter tripper having a coil and a solenoid plunger, which latter is movable by energization of said coil in a direction to actuate said shutter operating means; a circuit having an operating switch and including said coil and the flash lamp; a rod 35 having means to connect the same to the operating means of the camera shutter, said rod having a laterally extending formation 170 and another lateral formation 167, the said solenoid plunger having a sleeve 162 through the partly closed end of which the said rod 35 with the lateral projection 167 extends, thereby providing for lost motion between said plunger and said rod; spring means tending to move said sleeve in a direction which is opposite to the direction of magnetic pull of the said coil upon energization; and a sleeve threaded upon the shutter tripper and having an inturned part to engage the said lateral projection 170 and upon adjustment to vary the position of said rod 35, thereby varying the distance that the solenoid plunger travels upon energization of the coil, before imparting operating movement to said rod 35.

12. In mechanism for synchronizing the firing of a flash lamp with the actuation of the operating means of a camera shutter; an electro-magnetic shutter tripper having a coil and a solenoid plunger, which latter is movable by energization of said coil in a direction to actuate said shutter operating means; a circuit having an operating switch and including said coil and the flash lamp; the camera having a lens board provided with a tripper supporting bracket 136, cap 139 screwed upon the tripper structure and holding the latter and said bracket together, a lengthwise adjustable sleeve 168 upon said cap and having a partly closed end, an operating rod 35 having a clevis means for connecting the same to the operating means of the camera shutter; a sleeve 162 connected to an end of said solenoid plunger and having a coiled supporting spring, said rod 35 having a lateral formation 170 to be engaged by said sleeve 168 to determine the extent of lost motion of the plunger when energized with respect to said rod 35, and a laterally extending disk 167 to be engaged by said sleeve 162, and thereby cause movement of said operating rod 35.

13. In mechanism for synchronizing the firing of a flash lamp with the actuation of the operating means of a camera shutter; an electro-magnetic shutter tripper having a coil and a solenoid plunger, which latter is movable, by energization of said coil, in a direction to actuate said shutter operating means; a circuit having an operating switch and including said coil and the flash lamp; and means so to position and support the solenoid plunger and including a light supporting spring of just the requisite strength to hold said plunger in its all-the-way-up position until the energization of said coil, that said plunger, excepting for said spring, is in a free state at the instant of making the exposure.

14. In mechanism for synchronizing the firing of a flash lamp with the actuation of the operating means of a camera having a lens board with a shutter provided with a release lever; an electro-magnetic shutter tripper mountable upon the said lens board of the camera, so as to be readily removed therefrom, and provided with a coil and a solenoid plunger that is movable by energization of said coil in a direction to actuate the shutter release lever; a rod or shaft 35 co-axially supported with respect to the said solenoid plunger so as to be moved in a path co-axially therewith by movement of said solenoid plunger; and means also positioned in said co-axial path for connecting said rod or shaft 35 to said release lever, said connecting means being of a structure permitting ready separation of the parts, thereby permitting ready removal of the said electro-magnetic tripper from the lens board.

15. In mechanism for synchronizing the firing of a flash lamp with the actuation of the operating means of a camera having a lens board with a shutter provided with a release lever; an electro-magnetic shutter tripper mountable upon the said lens board of the camera, so as to be readily removed therefrom, and provided with a coil and a solenoid plunger that is movable by energization of said coil in a direction to actuate the shutter release lever; a rod or shaft 35 co-axially supported with respect to the said solenoid plunger so as to be moved in a path co-axially therewith by movement of said solenoid plunger; a transversely extending part directly connected to said rod or shaft 35 in said co-axial path, a clevis connected to said transversely extending part in said co-axial path; and means to connect said clevis to said release lever.

16. In mechanism for synchronizing the firing of a flash lamp with the actuation of the operating means of a camera shutter; an electro-magnetic shutter tripper having a coil and a solenoid plunger movable by energization of said coil in a direction to actuate said shutter operating means, but which solenoid plunger has always an unvarying starting position; lost-motion connection means between said solenoid plunger and said shutter operating means; a circuit having an operating switch and including said coil and the flash lamp; and means for manually adjusting and thereby varying the time delay between the action of the said shutter tripper and the said shutter operating means, including means for varying, through said lost-motion connection means, the distance of movement of the said solenoid plunger through said lost-motion connection means under the magnetic pull of said coil from said unvarying starting position to its shutter operating position.

OSCAR STEINER.